(12) United States Patent
Chen et al.

(10) Patent No.: US 10,803,318 B1
(45) Date of Patent: Oct. 13, 2020

(54) AUTOMATED SCORING OF VIDEO CLIPS USING EXTRACTED PHYSIOLOGICAL FEATURES

(71) Applicant: Educational Testing Service, Princeton, NJ (US)

(72) Inventors: Lei Chen, Lawrenceville, NJ (US); Gary Feng, Princeton, NJ (US); Chee Wee Leong, Pennington, NJ (US); Chong Min Lee, Pennington, NJ (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 15/597,756

(22) Filed: May 17, 2017

Related U.S. Application Data (60) Provisional application No. 62/338,110, filed on May 18, 2016.

(51) Int. Cl.
| | | |
|---|---|---|
| *G06K 9/00* | (2006.01) | |
| *G06K 9/62* | (2006.01) | |
| *G06Q 10/10* | (2012.01) | |
| *G06N 5/04* | (2006.01) | |

(52) U.S. Cl.
CPC ..... *G06K 9/00718* (2013.01); *G06K 9/00302* (2013.01); *G06K 9/00335* (2013.01); *G06K 9/00456* (2013.01); *G06K 9/6219* (2013.01); *G06K 9/6223* (2013.01); *G06K 9/6224* (2013.01); *G06K 9/6269* (2013.01); *G06N 5/04* (2013.01); *G06Q 10/1053* (2013.01)

(58) Field of Classification Search
CPC ........... G06K 9/00718; G06K 9/00302; G06K 9/00335; G06K 9/00456; G06K 9/6219
See application file for complete search history.

(56) References Cited

U.S. PATENT DOCUMENTS

2015/0269529 A1* 9/2015 Kyllonen ........... G06Q 10/1053
705/321

OTHER PUBLICATIONS

Mikolov et al: "Efficient Estimation of Word Representations in Vector Space", 2013.*
Baker et al: "Distributional Clustering of Words for Text Classification",1998.*
Bengio et al: "A Neural Probabilistic Language Model", 2003 (Year: 2003).*
Barrick, Murray; Accuracy of Interviewer Judgments of Job Applicants Personality Traits; Personnel Psychology, 53(4); pp. 925-951; 2000.

(Continued)

*Primary Examiner* — Ruiping Li
(74) *Attorney, Agent, or Firm* — Jones Day (57) ABSTRACT

Systems and methods are provided for scoring video clips using visual feature extraction. A signal including a video clip of a subject is received. For each frame of the video clip, physiological features of the subject visually rendered in the video clip are extracted. A plurality of visual words associated with the extracted physiological features are determined. A document including the plurality of visual words is generated. A plurality of feature vectors associated with the document are determined. The plurality of feature vectors to a regression model for scoring are provided.

24 Claims, 6 Drawing Sheets

(56) References Cited

OTHER PUBLICATIONS

Bruni, Elia, Tran, Giang Binh, Baroni, Marco; Distributional Semantics from Text and Images; Proceedings of the GEMS 2011 Workshop on Geometrical Models of Natural Language Semantics; pp. 22-32; Jul. 2011.

Chatterjee, Moitreya, Park, Sughyun, Morency, Louis-Philippe, Scherer, Stefan; Combining Two Perspectives on Classifying Multimodal Data for Recognizing Speaker Traits; Proceedings of the 2015 ACM on International Conference on Multimodal Interactions; pp. 7-14; 2015.

Chen, Lei, Feng, Gary, Joe, Jilliam, Leong, Chee Wee, Kitchen, Christopher, Lee, Chong Min; Towards Automated Assessment of Public Speaking Skills Using Multimodal Cues; Proceedings of the 16th International Conference on Multimodal Interfaces; 2014.

Chen, Lei, Yoon, Su-Youn; Application of Structural Events Detected on ASR Outputs for Automated Speaking Assessment; Interspeech; 2012.

Chen, Lei, Zechner, Klaus; Applying Rhythm Features to Automatically Assess Non-Native Speech; Interspeech; pp. 1861-1864; 2011.

Chen, Lei, Zechner, Klaus, Xi, Xiaoming; Improved Pronunciation Features for Construct-Driven Assessment of Non-Native Spontaneous Speech; Human Language Technologies: The 2009 Annual Conference of the North American Chapter of the ACL; pp. 442-449; Jun. 2009.

Debnath, Sukumar, Lee, B. Brian, Tandon, Sudhir; Fifty Years and Going Strong: What Makes Behaviorally Anchored Rating Scales So Perennial as an Appraisal Method?; International Journal of Business and Social Science, 6(2); pp. 16-25; Feb. 2015.

DeGroot, Timothy, Gooty, Janaki; Can Nonverbal Cues be Used to Make Meaningful Personality Attributions in Employment Interviews?; Journal of Business and Psychology, 24(2); pp. 179-192; Jun. 2009.

Downey, Ryan, Rubin, David, Cheng, Jian, Bernstein, Jared; Performance of Automated Scoring for Children's Oral Reading; Proceedings of the 6th Workshop on Innovative Use of NLP for Building Educational Applications; pp. 46-55; Jun. 2011.

Forbes, Ray, Jackson, Paul; Non-Verbal Behaviour and the Outcome of Selection Interviews; Journal of Occupational and Organizational Psychology; 53(1); pp. 65-72; Mar. 1980.

Gatica-Perez, Daniel; Signal Processing in the Workplace; IEEE Signal Processing Magazine, 32(1); pp. 121-125; Jan. 2015.

Hiemstra, Annemarie, Derous, Eva; Video Resumes Portrayed: Findings and Challenges; Ch. 3 in Employee Recruitment, Selection, and Assessment: Contemporary Issues for Theory and Practice; Psychology Press: New York, NY; pp. 44-60; 2015.

Huffcutt, Allen, Conway, James, Roth, Philip, Stone, Nancy; Identification and Meta-Analytic Assessment of Psychological Constructs Measured in Employment Interviews; Journal of Applied Psychology, 86(5); pp. 897-913; 2001.

Imada, Andrew, Hakel, Milton; Influence of Nonverbal Communication and Rater Proximity on Impressions and Decisions in Simulated Employment Interviews; Journal of Applied Psychology, 62(3); pp. 295-300; Jun. 1977.

Koch, Gary; Intraclass Correlation Coefficient; Encyclopedia of Statistical Sciences, S. Kotz & N. Johnson, Eds.; pp. 212-217; 1982.

Krajewski, Henryk, Goffin, Richard, McCarthy, Julie, Rothstein, Mitchell, Johnston, Norman; Comparing the Validity of Structured Interviews for Managerial-Level Employees: Should We Look to the Past or Focus on the Future?; Journal of Occupational and Organizational Psychology, 79; pp. 411-432; 2006.

Kuhn, Max; Building Predictive Models in R Using the Caret Package; Journal of Statistical Software, 28(5); pp. 1-26; Nov. 2008.

Le, Quoc, Mikolov, Tomas; Distributed Representations of Sentences and Documents; Proceedings of the 31st International Conference on Machine Learning; pp. 1188-1196; 2014.

Maes, Jeanne, Weldy, Teresa, Icenogle, Marjorie; A Managerial Perspective: Oral Communication Competency is Most Important for Business Students in the Workplace; International Journal of Business Communication, 34(1); pp. 67-80; Jan. 1997.

Mikolov, Tomas, Sutskever, Ilya, Chen, Kai, Corrado, Greg, Dean, Jeffrey; Distributed Representations of Words and Phrases and Their Compositionality; Advances in Neural Information Processing Systems; 2013.

Naim, Iftekhar, Tanveer, M. Iftekhar, Gildea, Daniel, Hoque, Mohammed Ehsan; Automated Prediction and Analysis of Job Interview Performance: The Role of What You Say and How You Say It; In Proceedings of Automatic Face and Gesture Recognition; 2015.

Nguyen, Laurent Son, Frauendorfer, Denise, Mast, Marianne, Gatica-Perez, Daniel; Hire Me: Computational Inference of Hirability in Employment Interviews Based on Nonverbal Behavior; IEEE Transactions on Multimedia, 16(4); pp. 1018-1031; Jun. 2014.

Nikolaou, Ioannis, Oostrom, Janneke; Employee Recruitment, Selection, and Assessment: Contemporary Issues for Theory and Practice; Psychology Press: New York, NY; 2015.

Oostrom, Janneke, Born, Marise, Serlie, Alec, van der Molen, Henk; Webcam Testing: Validation of an Innovative Open-Ended Multimedia Test; European Journal of Work and Organizational Psychology, 19(5); pp. 532-550; 2010.

Oostrom, Janneke, Born, Marise, Serlie, Alec, van der Molen, Henk; A Multimedia Situational Test With a Constructed-Response Format: Its Relationship with Personality, Cognitive Ability, Job Experience, and Academic Performance; Journal of Personnel Psychology, 10(2); pp. 78-88; 2011.

Parsons, Charles, Liden, Robert; Interviewer Perceptions of Applicant Qualifications: a Multivariate Field Study of Demographic Characteristics and Nonverbal Cues; Journal of Applied Psychology, 69(4); pp. 557-568; 1984.

Pedregosa, Fabian, Varoquaux, Gael, Gramfort, Alexandre, Michel, Vincent, Thirion, Bertrand, Grisel, Olivier, Blondel, Mathieu, Prettenhofer, Peter, Weiss, Ron, Dubourg, Vincent, Vanderplas, Jake, Passos, Alexandre, Cournapeau, David, Brucher, Matthieu, Perrot, Matthieu, Duchesnay, Edouard; Scikit-learn: Machine Learning in Python; Journal of Machine Learning Research, 12; pp. 2825-2830; 2011.

Pennebaker, James, Booth, Roger, Francis, Martha; Linguistic Inquiry and Word Count: LIWC2007; Lawrence Erlbaum Associates: Mahwah, NJ; 2001.

Rehurek, Radim, Sojka, Petr; Software Framework for Topic Modelling With Large Corpora; Proceedings of the LREC Workshop on New Challenges for NLP Framework; pp. 45-50; May 2010.

Scherer, Stefan, Stratou, Giota, Morency, Louis-Philippe; Audiovisual Behavior Descriptors for Depression Assessment; Proceedings of the 15th ACM on International Conference on Multimodal Interaction; pp. 135-140; 2013.

Smith, Patricia, Kendall, L.M.; Retranslation of Expectations: An Approach to the Construction of Umambiguous Anchors for Rating Scales; Journal of Applied Psychology, 47(2); pp. 149-155; Apr. 1963.

Tausczik, Yla, Pennebaker, James; The Psychological Meaning of Words: LIWC and Computerized Text Analysis Methods; Journal of Language and Social Psychology, 29(1); pp. 24-54; 2010.

Vinciarelli, Alessandro, Pantic, Maja, Heylen, Dirk, Pelachaud, Catherine, Poggi, Isabella, D'Errico, Francesca, Schroeder, Marc; Bridging the Gap Between Social Animal and Unsocial Machine: A Survey of Social Signal Processing; IEEE Transactions on Affective Computing, 3(1); pp. 69-87; Jan.-Mar. 2012.

Wiesner, Willi, Cronshaw, Steven; A Meta-Analytic Investigation of the Impact of Interview Format and Degree of Structure on the Validity of the Employment Interview; Journal of Occupational Psychology, 61(4); pp. 275-290; 1988.

Witt, Silke; Use of Speech Recognition in Computer-Assisted Language Learning; Unpublished Dissertation, Cambridge University Engineering Department; Cambridge, UK; 1999.

Wright, Patrick, Lichtenfels, Philip, Pursell, Elliot; The Structured Interview: Additional Studies and a Meta-Analysis; Journal of Occupational and Organizational Psychology, 62(3); pp. 191-199; Sep. 1989.

(56) References Cited

OTHER PUBLICATIONS

Zechner, Klaus, Higgins, Derrick, Xi, Xiaoming, Williamson, David; Automatic Scoring of Non-Native Spontaneous Speech in Tests of Spoken English; Speech Communication, 51(10); pp. 883-895; Oct. 2009.

* cited by examiner

AUTOMATED SCORING OF VIDEO CLIPS USING EXTRACTED PHYSIOLOGICAL FEATURES

CROSS REFERENCE TO RELATED APPLICATIONS

This application is related to U.S. Patent Application No. 62/338,110, entitled "Automated Scoring of Interview Videos Using Doc2Vec Multimodal Feature Extraction Paradigm," filed May 18, 2016, the entirety of which is herein incorporated by reference.

TECHNICAL FIELD

The present disclosure relates generally to the automated scoring of interview videos, and, more specifically, to processor-implemented systems and methods using physiological feature extraction paradigms.

BACKGROUND

Visual feature extraction scoring systems are useful in a variety of contexts, where desirable fields for their implementation continue to grow. A visual feature extraction scoring system (e.g., an automatic scoring system of an interview video clip) extracts physiological features (e.g., head postures, eye gazes, or facial expressions) from a person videotaped during an interview, resulting in a document of visual words characterizing the physiological features of the person. This document can be scored using a vector generating algorithm based on the visual words within the document.

It is often desirable to measure a score which reflects the performance of a person during an interview using a visual feature extraction scoring system. That score can be useful for gauging the level of effort given by the person interacting with the system (e.g., in a job interview pre-screening implementation).

SUMMARY

Systems and methods are provided for scoring video clips using visual feature extraction implemented by one or more data processors forming one or more computing devices. A signal including a video clip of a subject is received. For each frame of the video clip, physiological features of the subject visually rendered in the video clip are extracted. A plurality of visual words associated with the extracted physiological features are determined. A document including the plurality of visual words is generated. A plurality of feature vectors associated with the document are determined. The plurality of feature vectors are provided to a regression model for scoring.

In another example, a system for scoring video clips using visual feature extraction includes one or more data processors and a computer-readable medium encoded with instructions for commanding the one or more data processors to execute a method. In the method, a signal that includes a video clip of a subject is received. For each frame of the video clip, physiological features of the subject visually rendered in the video clip are extracted. A plurality of visual words associated with the extracted physiological features are determined. A document including the plurality of visual words is generated. A plurality of feature vectors associated with the document are determined. The plurality of feature vectors are provided to a regression model for scoring.

As a further example, a non-transitory computer-readable medium is encoded with instructions for commanding a processing system to execute steps of a method for scoring video clips using visual features. In the method, a signal that includes a video clip of a subject is received. For each frame of the video clip, physiological features of the subject visually rendered in the video clip are extracted. A plurality of visual words associated with the extracted physiological features are determined. A document including the plurality of visual words is generated. A plurality of feature vectors associated with the document are determined. The plurality of feature vectors are provided to a regression model for scoring.

DETAILED DESCRIPTION

Analyzing a video clip of a subject during an interview for various behaviors can provide insight into the subject. For example, both verbal and non-verbal behaviors can be evaluated. Interviewers can exhibit multimodal behaviors (e.g., through demonstrating various physiological features) such as speech content, prosody, or non-verbal cues to communicate their qualifications during a predetermined time slot. Analyzing the non-verbal physiological features of an interview can provide additional insight into a decision on what action to take regarding that particular interview (e.g., whether to hire the interviewee).

Figure 1:
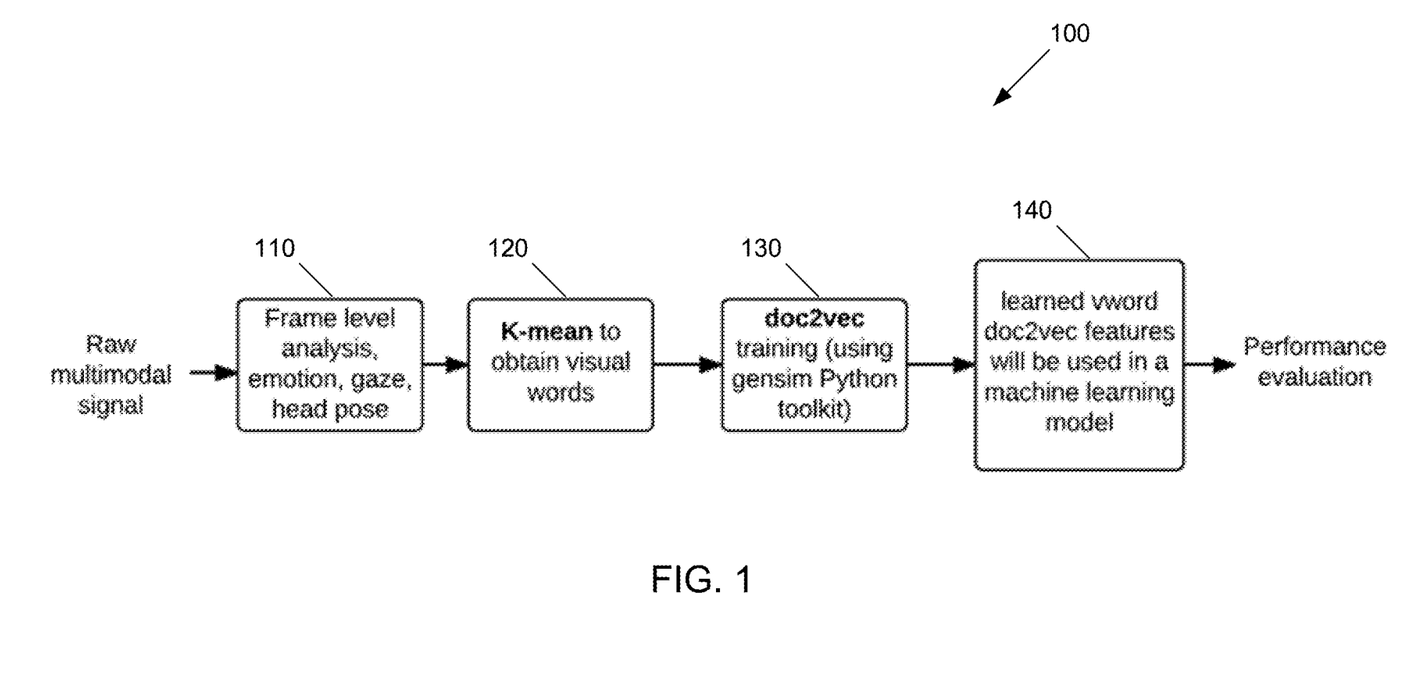
FIG. 1 is a data flow diagram illustrating an example process flow of scoring video clips using extracted visual features.

FIG. 1 is a data flow diagram illustrating an example process flow of scoring video clips using extracted visual features. A raw multimodal signal (e.g., a video clip) of a subject is provided. For each frame within the video clip, various physiological features of the subject are extracted at 110 (e.g., emotions, eye gaze, or head postures). Each frame within the video clip can be a series of still images from which measurements of the subject's movements can be evaluated. These measurements are converted to a set of values over a predetermined time interval (e.g., 0.5 seconds). The set of values are clustered together using a clustering algorithm to generate visual words. A non-exhaustive list of clustering algorithms can include, for example, K-Means, affinity propagation, mean shift clustering, hierarchical clustering including agglomerative and divisive clustering, spectral clustering, balanced iterative reducing and clustering using hierarchies (BIRCH), and density-based spatial clustering of applications with noise (DBSCAN). Visual words are a textual representation of a visual characteristic within the video clip. For example, the visual words can represent anger, contempt, disgust, joy, fear, sadness, or surprise and describe various emotions of a subject throughout the video to be primary emotions. Overall measurements such as positive, neutral, or negative can also represent words which further characterize the subject within the video clip. For eye gaze, for example, visual words can represent eyes turning to the left, looking forward, or turning to the right.

A document can be generated which includes the extracted visual words. Based on the document, the visual words can be converted to fixed-sized vectors using a vector generating algorithm, at 130. This vector generating algorithm can utilize a paragraph vector distributed memory model (e.g., doc2vec implemented in the Python Gensim package). The vectors can be provided to a regression model (e.g., a machine learning model) to determine a score. This score can, for example, predict personality and/or hiring decisions based on the video clip through application of one or more interview evaluation rubrics. The machine learning model can use, for example, a support vector machine regression model (e.g., having a linear kernel). Other examples of regression models can include ridge regression, least absolute shrinkage, and selection operator (LASSO) regression, and random forest regression. The determined score can reflect a prediction of an outcome of the interview (e.g., whether to hire an interviewee). The predicted score can be evaluated against various human rating interview rubrics to confirm prediction accuracy. Additionally, the predicted score can be used as independent variables when training regression models. A non-exhaustive listing of these rubrics can include a behaviorally-anchored rating scale (BARS), a first-impression-based personality measure, and/or a holistic hireability rating scale.

Developing of a BARS for an interview can include collecting a number of critical incidents which describe effective and ineffective episodes relating to job performance and editing the collected critical incidents to a common format. From this common format, performance categories can be extracted. A series of cleaning and filtering processes can be run on the critical incidents and/or performance categories. For example, BARS developers can manually review the performance categories for quality assurance to ensure that there is agreement of the assigned critical incidents to categories. A final rating score based on the cleaned and filtered critical incidents and categories is generated.

A first-impression-based personality measure is another scoring rubric that can be used to evaluate the predicted regression model output score. The raters of an interview can be provided with a number of statements used for measuring personality traits contained adjectives of the subject (e.g., assertive, irresponsible, cooperative, extroverted, agreeableness, conscientiousness, emotional stability, or openness to experience). The rated can evaluate, for example, using a 7-point Likert scale (e.g., 1=Strongly Disagree, 7=Strongly Agree).

A holistic hierability rating scale is yet another scoring rubric that can be used to evaluate the predicted regression model output score. This rubric asks raters of an interview whether the subject should be hired for a position.

Figure 2:
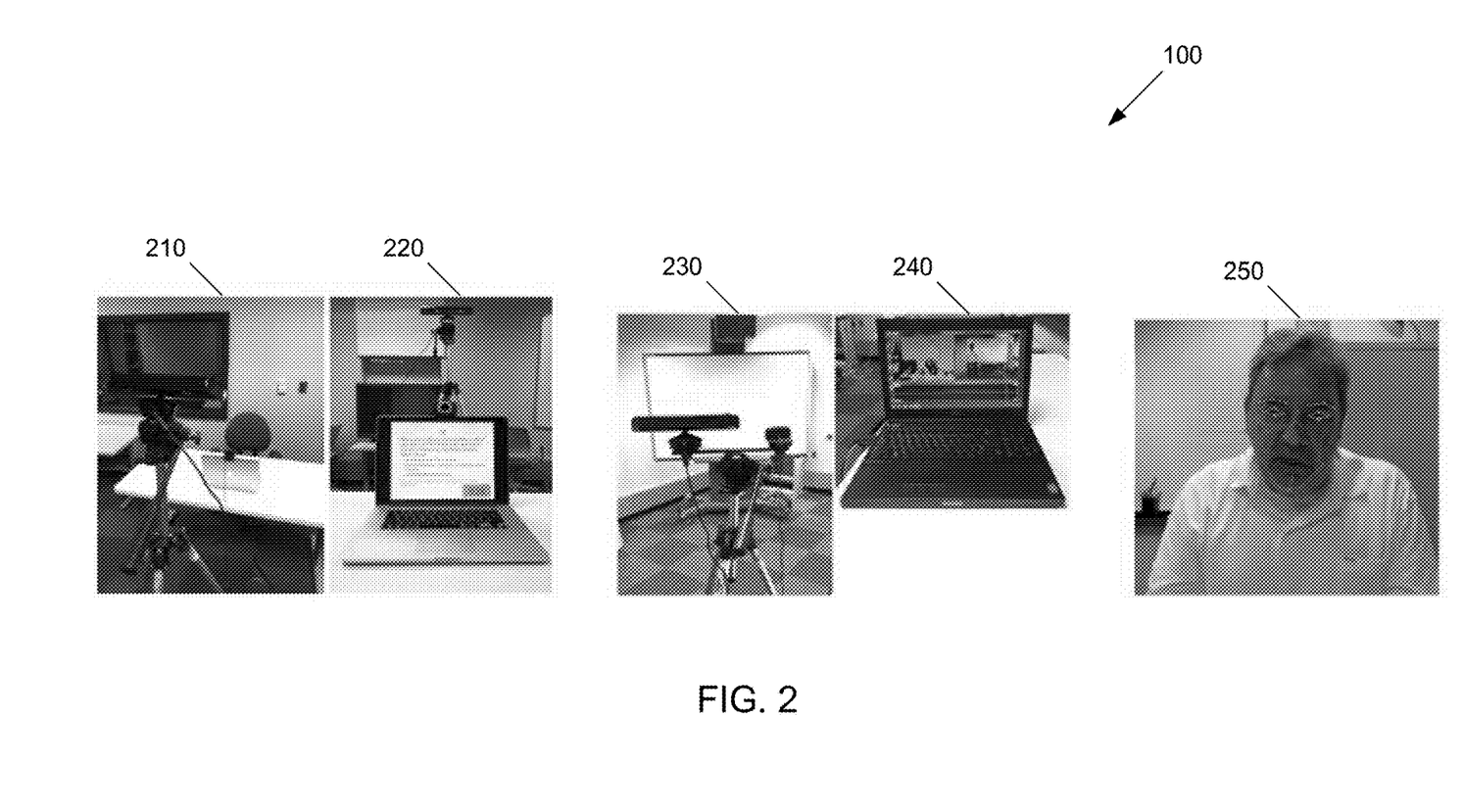
FIG. 2 is a series of images illustrating an example interview setup environment.

FIG. 2 is a series of images illustrating an example interview setup environment. A video clip of an interviewee can be collected in a variety of ways. In one example, a video clip can be recorded utilizing audio visual equipment 210 that can capture and store video clips. In some settings, an automated interview question prompt 220 can provide the interviewee with a series of predetermined questions. This setup can provide a monologue-style video clip of structured interview questions. Alternatively, an interviewee can be interviewed by one or more interviewer subjects. Additional motion detectors and/or sensors 230 can be utilized to collect additional motion tracking data associated with the subject during the interview. Motion detecting software 240 can provide for skeletal tracking of the subject during the interview. These measurements can provide numerical data for the visual words. Physiological features can be extracted from the video clip based on the various measurements (e.g., facial feature measurements 250) made throughout the interview. These physiological features are non-verbal behaviors that can be indicative of subject's personality and/or abilities. For example, variables such as keeping proper eye contact with interviewers and/or having an adequate amount of positive emotions. These non-verbal variables can be characterized, for example, based on head postures. Head postures can be approximated using a rotation attribute of the subject's head (e.g., pitch movement from left to right, yaw movement from up to down, or roll movement near to far). Eye gaze is another physiological variable that can be extracted. For example, using a video camera recording the video clip as a reference point, eye gaze direction can be estimated with three values determining the rotations around the X, Y, and Z axes in radians. Facial expressions can be determined based on an intensity value (e.g., ranging from 0.0 to 1.0) and confidence values to characterize primary emotions (e.g., anger, contempt, disgust, joy, fear, sadness, or surprise) as well as overall measurements of neutral, positive, or negative emotions.

Various statistical evaluations can be made based on the extracted physiological features. For example, for head poses and eye gaze directions, a feature measuring extreme values' ratio can be computed for each measurement. Percentiles (e.g., $10^{th}$ or $90^{th}$ percentiles) can be obtained from the vector data set based on the lower-bound and upper-bound of the data. For each contour measurement (e.g., pitch of the head pose), a proportion of the values beyond the lower-bound and upper-bound are used as a feature. For each visual measurement throughout the video clip, statistics moments can be computed (e.g., mean, standard deviation, kurtosis, or skewness).

Figure 3:
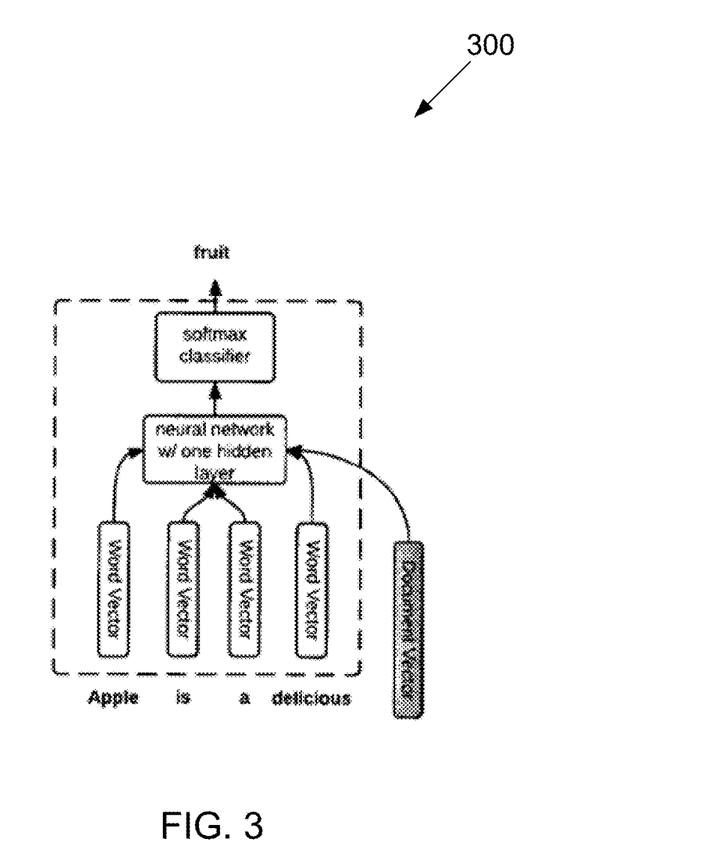
FIG. 3 is an exemplary vector generating algorithm.

FIG. 3 is an exemplary vector generating algorithm 300. An embedding matrix can automatically learn the words of a phrase and predict additional words of the sentence. For example, each word of the phrase "An apple is a delicious" can be mapped to a respective numeric representative word vector. These word vectors can be provided to a neural network model having a hidden layer. The neural network can also receive a document vector. Based on the word and document vector inputs, the neural network can generate an output word prediction. For example, the neural network can predict the next word of the phrase "An apple is a delicious" to be "fruit" resulting in the sentence "An apple is a delicious fruit." The word embedding matrix and neural network parameters can be learned from a corpus of documents using (e.g., a mini-batch stochastic gradient descent method).

Figure 4:
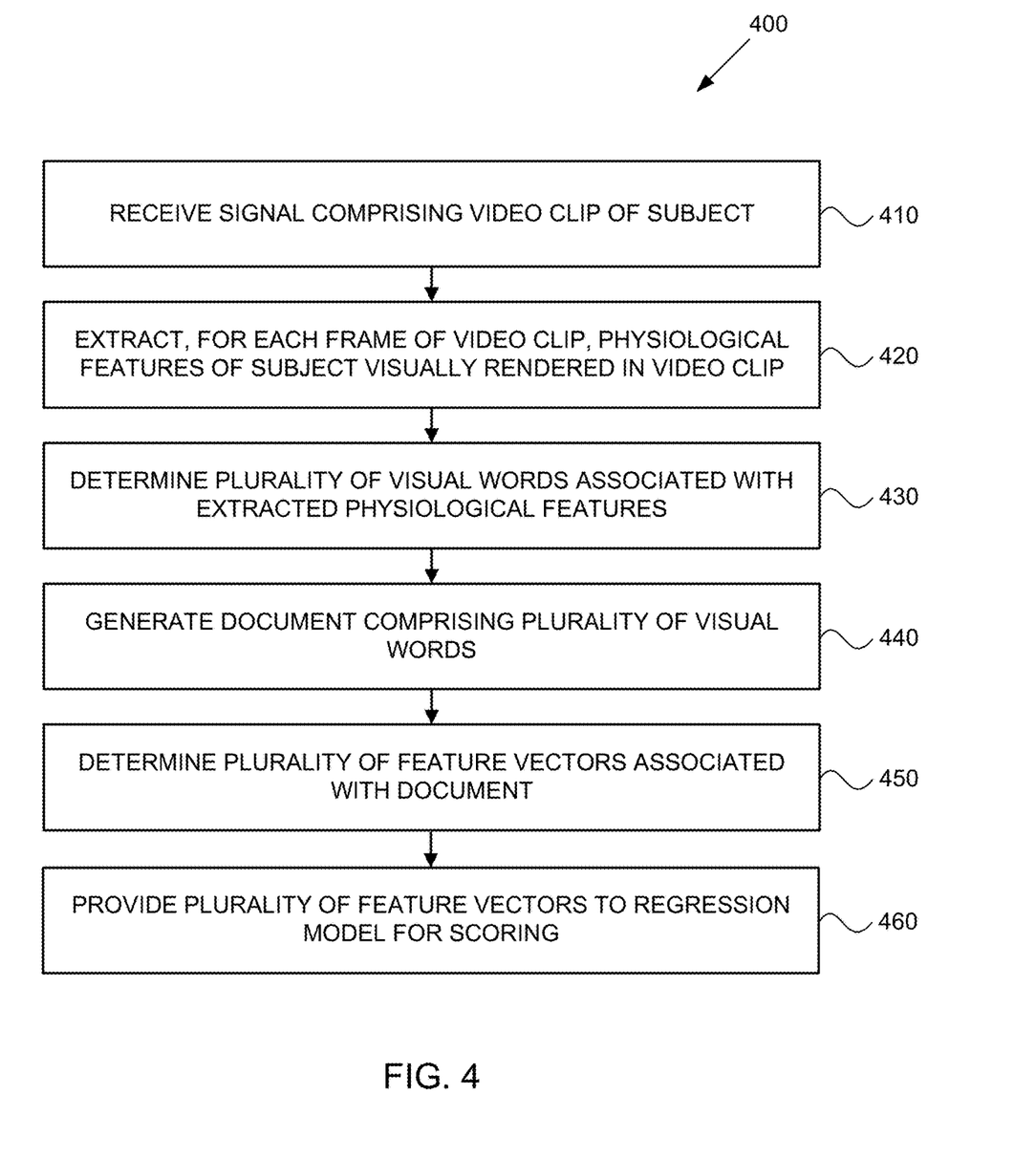
FIG. 4 is a process flow diagram for scoring video clips using visual feature extraction.

FIG. 4 is a process flow diagram 400 for scoring video clips using visual feature extraction. A signal including a video clip of a subject is received, at 410. For each frame of the video clip, physiological features of the subject that are visually rendered in the video clip are extracted, at 420, from the video clip. A plurality of visual words associated with the extracted physiological features are determined. A document comprising the plurality of visual words is generated, at 440. A plurality of feature vectors associated with the document are determined, at 450. The plurality of feature vectors are provided, at 460, to a regression model for scoring of the video clip. A score can be determined based on output data from the regression model. Based on the score, one or more personality traits (e.g., assertive, irresponsible, cooperative, extroverted, agreeableness, conscientiousness, emotional stability, or openness to experience) can be identified based on output data from the regression model. Additionally, the score can also provide insight into a hiring decision prediction as to whether the subject would be hired based on the exhibited behaviors captured during the video clip. Temporal sequences of the mapped physiological features can also be mapped to the video clip to provide a timeline of various behaviors exhibited during the interview.

Figure 5A:
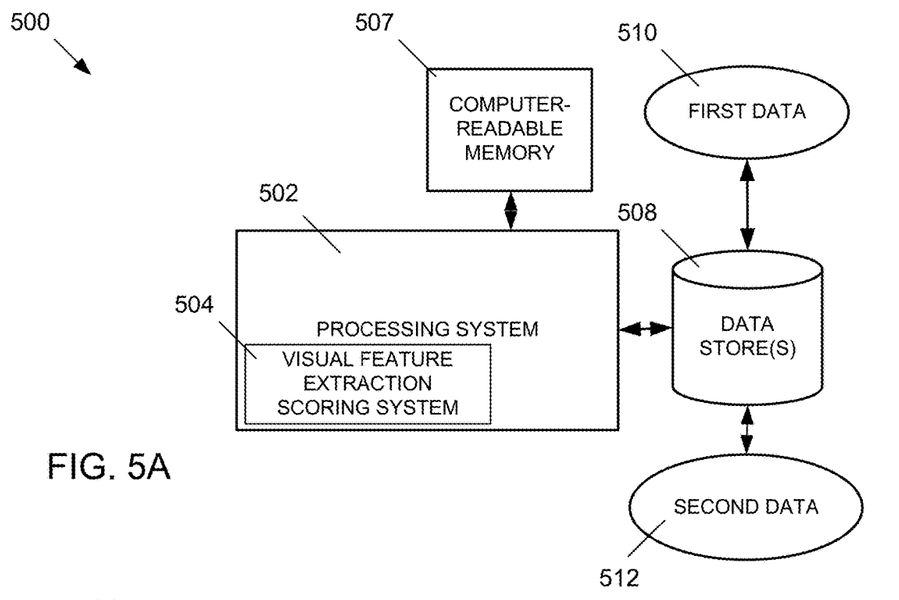
FIGS. 5A, 5B, and 5C depict example systems for implementing the approaches described herein for scoring video clips using visual feature extraction.
Figure 5B:
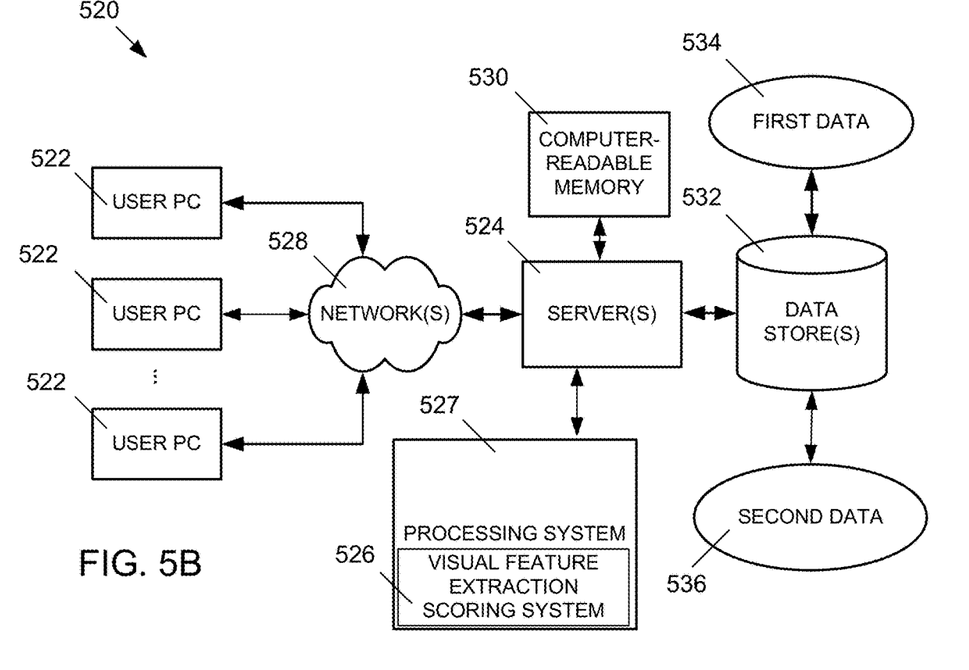
Figure 5C:
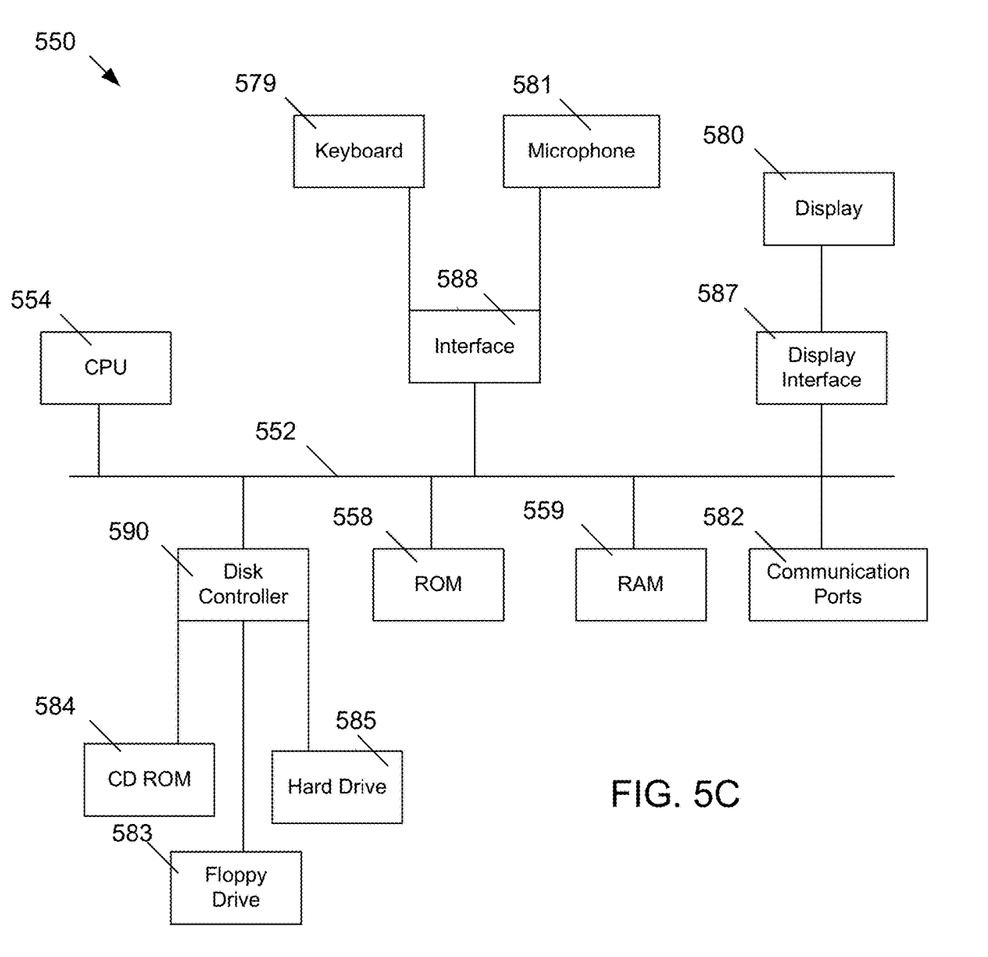

FIGS. 5A, 5B, and 5C depict example systems for implementing the approaches described herein for scoring video clips using visual features. For example, FIG. 5A depicts an exemplary system 500 that includes a standalone computer architecture where a processing system 502 (e.g., one or more computer processors located in a given computer or in multiple computers that may be separate and distinct from one another) includes a computer-implemented visual feature extracting scoring system 504 being executed on the processing system 502. The processing system 502 has access to a computer-readable memory 507 in addition to one or more data stores 508. The one or more data stores 508 may include first data 510 as well as second data 512. The processing system 502 may be a distributed parallel computing environment, which may be used to handle very large-scale data sets.

FIG. 5B depicts a system 520 that includes a client-server architecture. One or more user PCs 522 access one or more servers 524 running visual feature extracting scoring system 537 on a processing system 527 via one or more networks 528. The one or more servers 524 may access a computer-readable memory 530 as well as one or more data stores 532. The one or more data stores 532 may include first data 534 as well as second data 536.

FIG. 5C shows a block diagram of exemplary hardware for a standalone computer architecture 550, such as the architecture depicted in FIG. 5A that may be used to include and/or implement the program instructions of system embodiments of the present disclosure. A bus 552 may serve as the information highway interconnecting the other illustrated components of the hardware. A processing system 554 labeled CPU (central processing unit) (e.g., one or more computer processors at a given computer or at multiple computers), may perform calculations and logic operations required to execute a program. A non-transitory processor-readable storage medium, such as read only memory (ROM) 558 and random access memory (RAM) 559, may be in communication with the processing system 554 and may include one or more programming instructions for performing the method of scoring video clips using visual feature extraction. Optionally, program instructions may be stored on a non-transitory computer-readable storage medium such as a magnetic disk, optical disk, recordable memory device, flash memory, or other physical storage medium.

In FIGS. 5A, 5B, and 5C, computer readable memories 508, 530, 558, 559 or data stores 508, 532, 583, 584, 588 may include one or more data structures for storing and associating various data used in the example systems for visual feature extracting scoring. For example, a data structure stored in any of the aforementioned locations may be used to store data from XML files, initial parameters, and/or data for other variables described herein. A disk controller 590 interfaces one or more optional disk drives to the system bus 552. These disk drives may be external or internal floppy disk drives such as 583, external or internal CD-ROM, CD-R, CD-RW or DVD drives such as 584, or external or internal hard drives 585. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 590, the ROM 558 and/or the RAM 559. The processor 554 may access one or more components as required.

A display interface 587 may permit information from the bus 552 to be displayed on a display 580 in audio, graphic, or alphanumeric format. Communication with external devices may optionally occur using various communication ports 582.

In addition to these computer-type components, the hardware may also include data input devices, such as a keyboard 579, or other input device 581, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

The invention claimed is:

1. A method of scoring video clips using visual feature extraction implemented by one or more data processors forming one or more computing devices, the method comprising:

receiving, by at least one data processor, a raw multimodal signal comprising a video clip of a subject;
obtaining, by evaluating each frame within the video clip as a series of still images, measurements of the subject's movements;
extracting, by at least one data processor, based on the measurements of the subject's movements, physiological features of the subject visually rendered in the video clip;
determining, by at least one data processor, a plurality of visual words associated with the extracted physiological features;
generating, by at least one data processor, a document comprising the plurality of visual words;
determining, by at least one data processor, a plurality of fixed-sized feature vectors associated with the document;
generating, using a word embedding matrix, a softmax classifier, and a neural network having one non-linear hidden layer, a word prediction based on the plurality of fixed-sized feature vectors; and
providing, by at least one data processor, the plurality of fixed-sized feature vectors to a regression model for scoring.

2. The method according to claim 1, further comprising:
determining, by at least one data processor, based on output data from the regression model, a score associated with the video clip.

3. The method according to claim 2, further comprising:
identifying, by at least one data processor, at least one personality trait of the subject based on the determined score.

4. The method according to claim 2, further comprising:
determining, by at least one data processor, a hiring decision prediction of the subject based on the determined score.

5. The method according to claim 1, further comprising:
mapping, by at least one data processor, temporal sequences of the extracted physiological features to the plurality of visual words.

6. The method according to claim 1, wherein the plurality of visual words are determined by:
allocating, by at least one data processor, a set of values to the extracted physiological features;
averaging, by at least one data processor, the set of values on predetermined time intervals; and
stochastically clustering, by at least one data processor, a set of visual words from the plurality of visual words.

7. The method according to claim 6, wherein the set of visual words are clustered using at least one of K-Means clustering, affinity propagation clustering, mean shift clustering, hierarchical clustering comprising at least one of agglomerative clustering or divisive clustering, spectral clustering, balanced iterative reducing and clustering using hierarchies (BIRCH) clustering, or density-based spatial clustering of applications with noise (DBSCAN).

8. The method according to claim 1, wherein the video clip comprises an interviewee participating in an automated interview session for a predetermined time.

9. The method according to claim 1, wherein the plurality of fixed-sized feature vectors are determined using a vector generating algorithm based on word input data.

10. The method according to claim 9, wherein the vector generating algorithm uses a paragraph vector distributed memory model.

11. The method according to claim 1, wherein the extracted physiological features comprise at least one of an emotion, a gaze, or a head pose.

12. The method according to claim 1, wherein the regression model is a support vector machine regression model.

13. The method according to claim 1, wherein the visual word comprises a textual representation of a visual characteristic.

14. The method according to claim 1, wherein the visual word represents at least one of anger, contempt, disgust, joy, fear, sadness, surprise, positive, neutral, or negative.

15. A system for scoring video clips using visual feature extraction, the system comprising:
one or more data processors;
a computer-readable medium encoded with instructions for commanding the one or more data processors to execute steps comprising:
receiving, by at least one data processor, a raw multimodal signal comprising a video clip of a subject;
obtaining, by evaluating each frame within the video clip as a series of still images, measurements of the subject's movements;
extracting, by at least one data processor, based on the measurements of the subject's movements, physiological features of the subject visually rendered in the video clip;
determining, by at least one data processor, a plurality of visual words associated with the extracted physiological features;
generating, by at least one data processor, a document comprising the plurality of visual words;
determining, by at least one data processor, a plurality of fixed-sized feature vectors associated with the document;
generating, using a word embedding matrix, a softmax classifier, and a neural network having one non-linear hidden layer, a word prediction based on the plurality of fixed-sized feature vectors; and
providing, by at least one data processor, the plurality of fixed-sized feature vectors to a regression model for scoring.

16. The system according to claim 15, wherein the operations further comprise:
determining, by at least one data processor, based on output data from the regression model, a score associated with the video clip.

17. The system according to claim 16, wherein the operations further comprise:
identifying, by at least one data processor, at least one personality trait of the subject based on the determined score.

18. The system according to claim 16, wherein the operations further comprise:
determining, by at least one data processor, a hiring decision prediction of the subject based on the determined score.

19. The system according to claim 15, wherein the video clip comprises an interviewee participating in an automated interview session for a predetermined time.

20. A computer-readable medium encoded with instructions for commanding one or more data processors to execute steps of a method for scoring video clips using visual feature extraction, the steps comprising:
receiving, by at least one data processor, a raw multimodal signal comprising a video clip of a subject;

obtaining, by evaluating each frame within the video clip as a series of still images, measurements of the subject's movements;

extracting, by at least one data processor, based on the measurements of the subject's movements, physiological features of the subject visually rendered in the video clip;

determining, by at least one data processor, a plurality of visual words associated with the extracted physiological features;

generating, by at least one data processor, a document comprising the plurality of visual words;

determining, by at least one data processor, a plurality of fixed-sized feature vectors associated with the document;

generating, using a word embedding matrix, a softmax classifier, and a neural network having one non-linear hidden layer, a word prediction based on the plurality of fixed-sized feature vectors; and providing, by at least one data processor, the plurality of fixed-sized feature vectors to a regression model for scoring.

21. A system for scoring video clips using visual feature extraction, the system comprising:

one or more data processors;

a computer-readable medium encoded with instructions for commanding the one or more data processors to execute steps comprising:

receiving, by at least one data processor, a raw multimodal signal comprising a video clip of a subject;

obtaining, by evaluating each frame within the video clip as a series of still images, measurements of the subject's movements;

extracting, by at least one data processor, based on the measurements of the subject's movements, physiological features of the subject visually rendered in the video clip;

determining, by at least one data processor, a plurality of visual words associated with the extracted physiological features;

generating, by at least one data processor, a document comprising the plurality of visual words;

determining, by at least one data processor, a plurality of fixed-sized feature vectors associated with the document;

generating, using a word embedding matrix, a softmax classifier, and a neural network having one non-linear hidden layer, a word prediction based on the plurality of fixed-sized feature vectors;

providing, by at least one data processor, the plurality of fixed-sized feature vectors to a regression model for scoring;

determining, by at least one data processor, based on output data from the regression model, a score associated with the video clip;

identifying, by at least one data processor, at least one personality trait of the subject based on the determined score;

determining, by at least one data processor, a hiring decision prediction of the subject based on the determined score; and wherein the video clip comprises an interviewee participating in an automated interview session for a predetermined time.

22. A method of scoring video clips using visual feature extraction implemented by one or more data processors forming one or more computing devices, the method comprising:

receiving, by at least one data processor, a raw multimodal signal comprising a video clip of a subject;

obtaining, by evaluating each frame within the video clip as a series of still images, measurements of the subject's movements;

extracting, by at least one data processor, based on the measurements of the subject's movements, physiological features of the subject visually rendered in the video clip;

determining, by at least one data processor, a plurality of visual words associated with the extracted physiological features;

generating, by at least one data processor, a document comprising the plurality of visual words;

determining, by at least one data processor, a plurality of fixed-sized feature vectors associated with the document;

generating, using a word embedding matrix, a softmax classifier and a neural network having one non-linear hidden layer, a word prediction based on the plurality of fixed-sized feature vectors, wherein word embedding matrix and neural network parameters are learned from a corpus of documents using a mini-batch stochastic gradient descent method; and providing, by at least one data processor, the plurality of fixed-sized feature vectors to a regression model for scoring.

23. The method according to claim 22, wherein the fixed-sized feature vectors consist of at least one document vector or multiple numeric representative word vectors.

24. The method according to claim 22, wherein the embedding matrix automatically learns the words of a phrase and predicts additional words of the sentence.

* * * * *